(12) United States Patent
Mutha et al.

(10) Patent No.: US 12,455,759 B2
(45) Date of Patent: Oct. 28, 2025

(54) PEER VIRTUAL MACHINE MONITORING AND AUTO-HEALING SYSTEM

(71) Applicant: Microsoft Technology Licensing, LLC, Redmond, WA (US)

(72) Inventors: Akshay Navneetlal Mutha, Sammamish, WA (US); Eric Phillip Rodriguez, Colleyville, TX (US); Peilin Hao, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 496 days.

(21) Appl. No.: 17/950,298

(22) Filed: Sep. 22, 2022

(65) Prior Publication Data

US 2024/0103895 A1 Mar. 28, 2024

(51) Int. Cl.
*G06F 9/455* (2018.01)

(52) U.S. Cl.
CPC ........ *G06F 9/45558* (2013.01); *G06F 2009/45575* (2013.01); *G06F 2009/45591* (2013.01)

(58) Field of Classification Search
CPC ....... G06F 9/45558; G06F 2009/45575; G06F 2009/45591
See application file for complete search history.

(56) References Cited

U.S. PATENT DOCUMENTS

| | | | |
|---|---|---|---|
| 8,984,330 B2 | 3/2015 | Goose et al. | |
| 10,728,099 B2 | 7/2020 | Wu et al. | |
| 2005/0081212 A1* | 4/2005 | Goud | G06F 9/45558 718/107 |
| 2009/0119538 A1* | 5/2009 | Scales | G06F 11/2033 714/6.13 |
| 2011/0047541 A1* | 2/2011 | Yamaguchi | G06F 9/45558 718/1 |
| 2012/0117298 A1* | 5/2012 | Scannell | G06F 9/45558 711/6 |
| 2012/0137285 A1* | 5/2012 | Glikson | G06F 9/5077 718/1 |
| 2013/0054807 A1* | 2/2013 | Sherwood | G06F 12/16 709/226 |

(Continued)

FOREIGN PATENT DOCUMENTS

| | | |
|---|---|---|
| WO | 2017092539 A1 | 6/2017 |
| WO | 2020103627 A1 | 5/2020 |

*Primary Examiner* — Tuan C Dao

(74) *Attorney, Agent, or Firm* — Newport IP, LLC; Han Gim

(57) ABSTRACT

Systems and methods for monitoring health of virtual machines (VMs) include determining a leader virtual machine (VM) count for a group of VM nodes hosted on a plurality of computing devices; selecting a number of the VM nodes of the group to serve as leader VMs for the group, the number of the VM nodes selected corresponding to the leader VM count; and periodically performing a peer VM monitoring process. The peer VM monitoring process includes periodically storing health information for each of the VM nodes of the group in a data store; periodically accessing the health information of each of the VM nodes to identify sick VMs using each of the leader VMs, respectively; and automatically performing a healing process on the sick VMs to improve a performance of the sick VMs.

20 Claims, 6 Drawing Sheets

(56) References Cited

U.S. PATENT DOCUMENTS

| | | | |
|---|---|---|---|
| 2013/0086585 A1* | 4/2013 | Huang | G06F 9/5061 |
| | | | 718/1 |
| 2013/0246596 A1* | 9/2013 | Fujiwara | H04L 41/00 |
| | | | 709/223 |
| 2013/0290645 A1* | 10/2013 | Van De Ven | G06F 12/109 |
| | | | 711/147 |
| 2013/0290771 A1* | 10/2013 | Kim | G06F 11/1438 |
| | | | 714/3 |
| 2013/0332927 A1* | 12/2013 | Tang | G06F 9/45545 |
| | | | 718/1 |
| 2014/0109087 A1* | 4/2014 | Jujare | G06F 9/45558 |
| | | | 718/1 |
| 2015/0040129 A1* | 2/2015 | Park | G06F 9/4856 |
| | | | 718/1 |
| 2017/0031699 A1* | 2/2017 | Banerjee | G06F 12/0895 |
| 2018/0097701 A1* | 4/2018 | Wu | G06F 11/1484 |
| 2019/0319847 A1* | 10/2019 | Nahar | H04L 61/2592 |
| 2020/0285502 A1* | 9/2020 | Hildebrand | G06F 9/45558 |
| 2021/0019400 A1* | 1/2021 | Elgressy | G06F 9/5072 |
| 2021/0303177 A1* | 9/2021 | Kanjirathinkal | G06F 3/0604 |
| 2022/0043576 A1* | 2/2022 | Maezawa | G06F 3/0664 |
| 2022/0229679 A1 | 7/2022 | Mutha et al. | |
| 2023/0090251 A1* | 3/2023 | Hsiao | G06F 9/45545 |
| | | | 718/1 |

* cited by examiner

PEER VIRTUAL MACHINE MONITORING AND AUTO-HEALING SYSTEM

BACKGROUND

Cloud-based services provide computing services over the Internet or a dedicated network. These services may include, but are not limited to, applications for creating, consuming, and/or modifying content, file storage and management platforms, collaboration and communications platforms, and other types of software as a service. The services are typically implemented using a plurality of virtual machines hosted on one or more physical computing devices to process user requests for service, such as computations, communications, or other types of computing services. For example, virtual machines may be used to provide user logon, email hosting, web searching, website hosting, system updates, application development, or other types of computing services.

A virtual machine is typically considered healthy when the virtual machine is able to timely and efficiently fulfill end user requests. However, for various reasons, the performance of virtual machines may degrade over time to the point that a virtual machine is not able to timely and/or efficiently fulfill end user requests. Virtual machines that are not able to timely and/or efficiently fulfill end user requests are referred to as sick virtual machines (VMs). Sick VMs are typically taken out of rotation so that a recovery action, or healing process, may be performed in an effort to return the sick VMs to a healthy state.

VM infrastructures often implement some type of VM monitoring system to monitor the health of the virtual machines so that sick VMs may be identified and remedied in a timely and efficient manner. VM monitoring systems typically involve implementing some type of monitoring process within each VM node that periodically checks health information of the VM node and reports the health status of the node to an external component. When the health information indicates that the node is sick, the health status may be used to indicate that the node should be taken out of rotation so that a recovery action may be performed. However, it is possible for a VM node to become so sick that the monitoring process is not able to provide health status updates and therefore is not able to provide any indication that the node needs to be taken out of rotation. As a result, the sick VM may still receive incoming requests even though the node is not capable of processing them.

To solve this problem, some VM infrastructures have implemented a monitoring system in which a VM node is designated as a monitoring node for monitoring the health information of the other VM nodes of the system. However, since the system relies on a small number (e.g., one or a few) of designated nodes to monitor the health of other nodes, it may be difficult to validate the performance and/or accuracy of the monitoring system. In addition, it is possible that the designated nodes may themselves become unhealthy and compromise the performance and/or accuracy of the system.

As an alternative to using one or a few designated nodes to monitor VM health, some infrastructures have implemented monitoring systems in which each VM node is used to monitor the health of all of the other nodes in the system. While this system may not suffer from lack of validation, it can suffer from lack of efficiency, cost-effectiveness and slower performance. For example, the extra monitoring processes performed by each of the nodes utilizes resources that could otherwise be used for processing end user requests. As a result, requests may be processed slower while, at the same time, the cost of the system is increased because it utilizes more resources.

Hence, there is a need for systems and methods of monitoring the health of VMs, which do not suffer from the problems associated with previously known VM health monitoring methods.

SUMMARY

In one general aspect, the instant disclosure presents a data processing system having a processor and a memory in communication with the processor wherein the memory stores executable instructions that, when executed by the processor, cause the data processing system to perform multiple functions. The functions include determining a leader virtual machine (VM) count for a group of VM nodes hosted on a plurality of computing devices; selecting a number of the VM nodes of the group to serve as leader VMs for the group, the number of the VM nodes selected corresponding to the leader VM count; and periodically performing a peer VM monitoring process. The peer VM monitoring process includes periodically storing health information for each of the VM nodes of the group in a data store; periodically accessing the health information of each of the VM nodes to identify sick VMs using each of the leader VMs, respectively; and automatically performing a healing process on the sick VMs to improve a performance of the sick VMs.

In yet another general aspect, the instant disclosure presents a method of monitoring health of a group of virtual machine nodes. The method includes determining a leader virtual machine (VM) count for the group of VM nodes, the group of VM nodes being hosted on a plurality of computing devices; selecting a number of VM nodes from the group to serve as leader VMs for the group, the number of the VM nodes selected corresponding to the leader VM count; and
    periodically performing a peer VM monitoring process. The peer VM monitoring process includes periodically storing health information for each of the VM nodes of the group in a data store; periodically accessing the health information of each of the VM nodes to identify sick VMs using each of the leader VMs, respectively; and automatically performing a healing process on the sick VMs to improve a performance of the sick VMs.

In a further general aspect, the instant application describes a non-transitory computer readable medium on which are stored instructions that, when executed, cause a programmable device to perform functions. The functions include determining a leader virtual machine (VM) count for a group of VM nodes, the group of VM nodes being hosted on a plurality of computing devices; selecting a number of VM nodes from the group to serve as leader VMs for the group, the number of the VM nodes selected corresponding to the leader VM count; and periodically performing a peer VM monitoring process. The peer VM monitoring process includes periodically storing health information for each of the VM nodes of the group in a data store; periodically accessing the health information of each of the VM nodes to identify sick VMs using each of the leader VMs, respectively; and automatically performing a healing process on the sick VMs to improve a performance of the sick VMs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
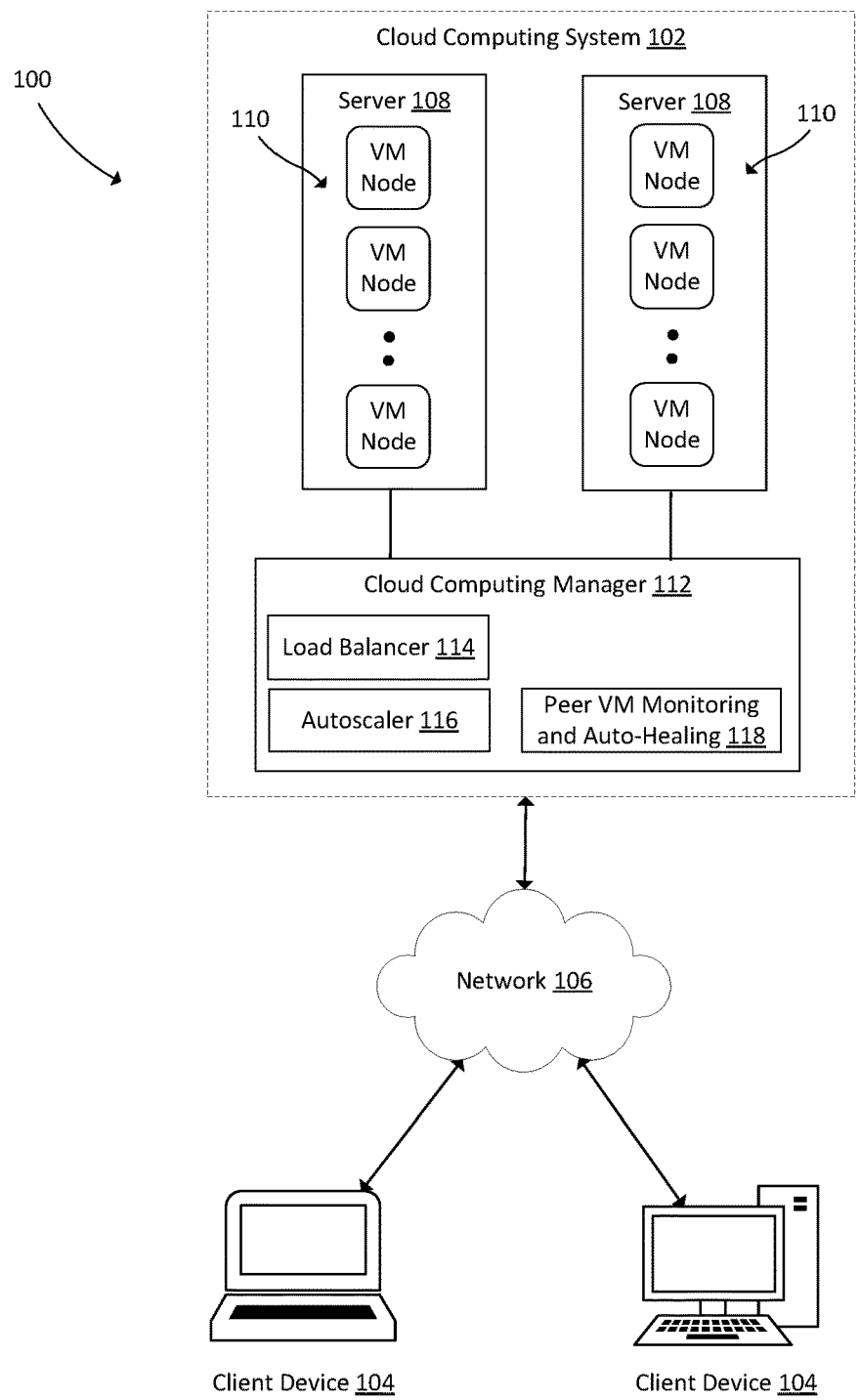
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As discussed above, one difficulty faced in implementing virtual machine (VM) infrastructures for cloud-based services is monitoring and maintaining the health of the VM '/nodes. VM monitoring systems typically involve implementing some type of monitoring process within each VM node that periodically checks health information of the VM node and reports the health status of the node to an external component. When the health information indicates that the node is unhealthy, or sick, the health status may be used to indicate that the node should be taken out of rotation so that a recovery action may be performed. However, it is possible for a VM node to become so sick that the monitoring process is not able to provide health status updates and therefore is not able to provide any indication that the node needs to be taken out of rotation. As a result, the sick VM may still receive incoming requests even though the node is not capable of processing them.

To solve this technical problem, some previously known VM infrastructures have implemented a monitoring system in which a VM node is designated as a monitoring node for monitoring the health information of the other VM nodes of the system. However, since the system relies on a small number (e.g., one or a few) of designated nodes to monitor the health of other nodes, it may be difficult to validate the performance and/or accuracy of the monitoring system. In addition, it is possible that the designated nodes may themselves become unhealthy and compromise the performance and/or accuracy of the system. In another previously known VM infrastructure, VM monitoring has been implemented by having each VM node monitor the health of all of the other nodes in the system. This method of VM monitoring can adversely impact the efficiency, cost-effectiveness, and performance speed of the VM infrastructure.

To address these technical problems and more, in an example, this description provides technical solutions in the form of a peer VM monitoring and auto-healing system that involves selecting an optimal number of leader VMs that are tasked to periodically check the health status of each of the other VM nodes, including the other leader VMs. A health monitoring process writes the health information for each VM node to a data store that is accessible by the leader VMs. The leader VMs periodically access the health information to ensure that sick VMs are identified and marked as sick. As used herein, the term "sick" is used to refer to VMs that are performing poorly which may be due to a number of issues, such as connectivity loss, deadlocks, high degree of latency, problems with external dependencies, excessive CPU/message usage, and the like, and may be generally defined as deviation of a performance metric from a target by a predetermined amount and/or for a predetermined amount of time. Once a VM node has been identified as being a sick VM, the sick VM may be automatically taken out of the rotation so a healing process may be performed, such as restarting the node, restoring the node, performing maintenance routines, and the like, in an effort to restore the health of the sick VM nodes. If all else fails, sick VM nodes may be replaced. In addition to peer VM monitoring, leader VMs are still utilized to perform their normal duties for the VM group which they are a part of, such as processing requests.

A leader VM count defines the number of VM nodes selected to serve as leader VMs for a group of nodes. The leader VM count depends on the total number of VM nodes and the number of physical computing devices hosting the nodes. In embodiments, an algorithm is defined for determining the leader VM count. The algorithm may define the leader VM count such that a predefined number of leader VMs are selected for a given number of VM nodes and/or a predetermined percentage of the VM nodes in a group are selected as leader VMs. In embodiments, the algorithm defines the leader VM count in such a way that the leader VM count increases as the total number of VM nodes to be monitored increases. In one implementation, the leader VM count is set to a predetermined amount, e.g., five leader VMs, when the total number of VM nodes is less than a hundred. When the total number of VM nodes is greater than a hundred, the leader VM count is set to a predetermined percentage of the total number of VM nodes, e.g., 5%. Leader VMs check the health status of other leader VMs so that leader VMs that are identified as sick VMs may be removed as leader VMs and replaced with healthy VM nodes so that the leader VM count may be maintained.

In embodiments, the leader VMs that are selected to fill the leader VM positions are chosen based on their health status. Unhealthy VMs and out-of-date VMs are not selected to serve as leader VMs. In addition, the leader VMs are chosen which are hosted by a plurality of different physical computing devices so that if a physical computing device fails only a limited number of leader VMs may be lost. In embodiments, the number of leader VMs that may be hosted by a physical computing device at the same time is limited to a predetermined total number or predetermined percentage of the total number of leader VMs. For example, in embodiments, physical computing devices may be limited to hosting one leader VM at a time. As another example, in embodiments, the number of leader VMs that may be hosted concurrently by a physical computing device is required to be less than a predetermined percentage, e.g., 20%, of the leader VM count.

The technical solutions described herein address the technical problem associated with previously known methods of VM monitoring. For example, setting the number of leader VMs to perform peer VM monitoring in the above manner is advantageous in that it ensures that a sufficient number of leader VMs are always available to check the health status of the VM nodes even in cases when a physical computing device fails and/or when one or more leader VMs become sick. Defining the leader VM count based on the number of nodes to be monitored also ensures that a sufficient number of leader VMs are used to provide reliable, accurate, and valid identification of sick VMs so recovery actions may be initiated in a timely manner. In embodiments, sick VMs may be identified by checking the last update time of the VM nodes. VM nodes that have not had a status update in a predetermined amount of time, e.g., 15 minutes, may be identified as sick VMs so recovery actions may be initiated. This has the advantage that health information, such as health score, is not required to identify sick VMs. This is advantageous in cases in which VMs are so sick that they are incapable of providing status updates for the system.

FIG. 1 shows an example computing environment 100, upon which aspects of this disclosure may be implemented. The computing environment 100 includes a cloud computing system 102, client devices 104, and a network 106. Cloud computing system 102 includes one or more servers 108 configured to provide one or more services and/or applications to client devices 104. Servers 108 may be any type of server including database servers, file servers, mail servers, print servers, web servers, game servers, and application servers. Servers may be organized in farms, clusters, racks, containers, data centers, geographically disperse facilities, and the like, and may communicate with each other via a variety of types of networks. Although two servers 108 are shown for the cloud computing system 102, any suitable number of servers may be utilized. Each server 108 includes one or more VM nodes 110 that provide computing resources for processing requests from client devices 104, executing applications and implementing the functionality of the cloud computing system 102. The servers 108 may include any suitable number of VM nodes 110.

Cloud computing system 102 may include a cloud computing manager 112 for managing resources of the cloud computing system 102. As such, the cloud computing manager 112 may be used for deploying, configuring and/or managing servers 108 and other resources of the system 102. The cloud computing manager 112 may be implemented in one or more computing devices which may be part of or separate from the servers. In embodiments, cloud computing manager 112 may be configured to implement a load balancer 114 for receiving requests from clients and directing requests to the appropriate server 108 or node 110. The load balancer 114 may utilize parameters such as load, number of connections, and overall performance to determine which server 108 and/or node 110 receives a client request.

Cloud computing system 102 may also include an autoscaler 116 for automatically adjusting the number of available computational resources, e.g., VM nodes 110, in the cloud computing system 102 based on the load or demand on the system. Autoscaler 116 may be configured to monitor one or more metrics indicative of the load on the cloud computing system 102, such as processor usage, memory usage, number of connections, and the like, and then scale the resources accordingly. When the load or traffic to the system is high, autoscaler 116 may provision additional VM nodes 110 so that more requests may be handled in a shorter amount of time. At times of reduced loads on the system, autoscaler 116 may be configured shut down VM nodes 110 which are being underutilized.

Cloud also includes a VM health monitoring and auto-healing system 118. As discussed below, the VM health monitoring and auto-healing system 118 utilizes a select number of healthy VMs from multiple physical computing devices to serve as leader VMs that will perform peer VM monitoring of all of the VM nodes 110 of the cloud computing system 102 to identify sick VMs. Sick VMs are marked and an auto-healing process is performed to improve the health of sick VMs.

Client devices 104 enable users to request access to services and/or applications offered by the cloud computing system 102. Client devices 104 may comprise any suitable type of computing device that enables a user to interact with various applications. Examples of suitable computing devices include but are not limited to personal computers, desktop computers, laptop computers, mobile telephones, smart phones, tablets, phablets, smart watches, wearable computers, gaming devices/computers, televisions, and the like. Client devices 104 and cloud computing system 102 communicate via network 106. Network 106 may include one or more wired/wireless communication links and/or communication networks, such as a PAN (personal area network), a LAN (local area network), a WAN (wide area network), or a combination of networks, such as the Internet.

Figure 2:
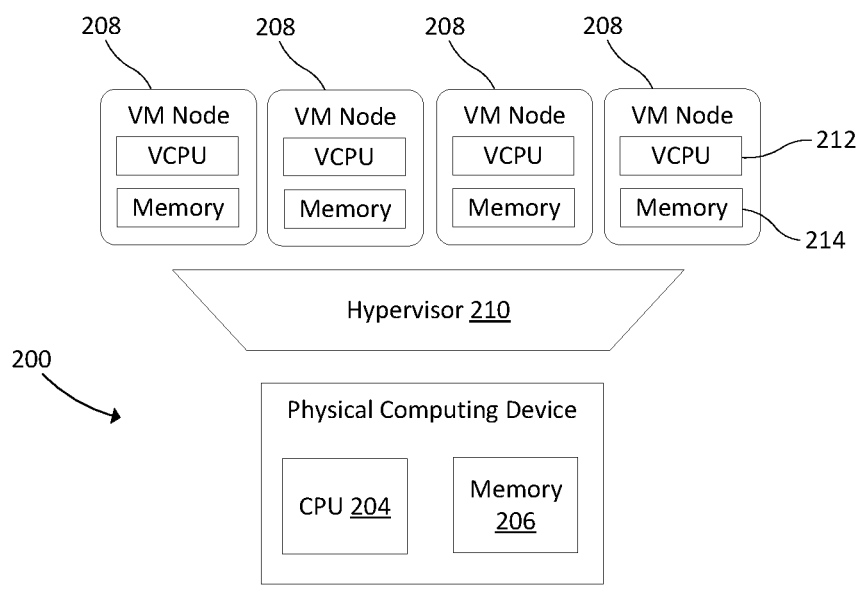
FIG. 2 shows an example of a computing device for implementing virtual machine (VM) nodes for a cloud computing system, such as the cloud computing system of FIG. 1.

The VM nodes 110 are hosted on one or more physical computing devices. FIG. 2 shows an example implementation of a computing device 200 for hosting VM nodes. Computing device 200 of FIG. 2 may be any of a variety of different types of computing device. For example, computing device 200 may be a desktop computer, a server computer, a laptop, and the like. Computing device 200 includes physical resources, such as a central processing unit (CPU) 204 and memory 206. Computing device 200 may include other components not shown, such as network interface devices, disk storage, input/output devices, and the like. The CPU 204 may be any type or brand of CPU. The memory 206 may include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 204. Though computing device 200 is shown as having only one CPU 204 and one memory 206, a computing device may include any suitable number of processors and/or memories.

Computing device 200 is a host device, and, as such, is configured to host one or more VM nodes 208. To this end, computing device 200 includes a hypervisor 210 configured to generate, monitor, terminate, and/or otherwise manage VM nodes 208. Hypervisor 210 is software, firmware and/or hardware that emulates virtual resources for the VM nodes 208 using the physical resources 204, 206 of the computing device 200. More specifically, hypervisors 210 allocate processor time, memory, and disk storage space for each VM node 208. The hypervisor 210 also provides isolation between the VM nodes 208 such that each VM node 208 can include its own operation system and run its own programs.

VM nodes 208 are software implementations of physical computing devices that can each run programs analogous to physical computing devices. Each VM node 208 may include virtual resources, such as virtual processor (VCPU) 212 and virtual memory 214 and may be configured to implement a guest operating system. The VCPU 212 is implemented as software with associated state information that provide a representation of a physical processor with a specific architecture. Different VM nodes 208 may be configured to emulate different types of processors. For example, one VM node may have a virtual processor having characteristics of an Intel x86 processor, whereas another VM node may have the characteristics of a PowerPC processor. Guest operating system may be any operating system such as, for example, operating systems from Microsoft®, Apple®, Unix, Linux, and the like. Guest operating system may include user/kernel modes of operation and may have kernels that can include schedulers, memory managers, etc. Each guest operating system may have associated file systems implemented in virtual memory and may schedule threads for executing applications on the virtual processors. Applications may include applications for processing client requests and/or implementing functionality of the server.

The hypervisor 210 enables multiple VM nodes 208 to be implemented on computing device 200 by allocating portions of the physical resources 204, 206 of the computing devices 202, such as processing time, memory, and disk storage space, to each VM node 208. Hypervisor 210 may be configured to implement any suitable number of VM nodes 208 on the computing device 200. The hypervisor 210 of FIG. 2 is shown has having instantiated five VM nodes 208 although computing devices are generally capable of supporting more VM nodes. Hypervisor may be configured to provision any suitable number of VM nodes 208 on computing device 200 depending on various factors, such as hardware configuration, software configuration, application, and the like.

Figure 3:
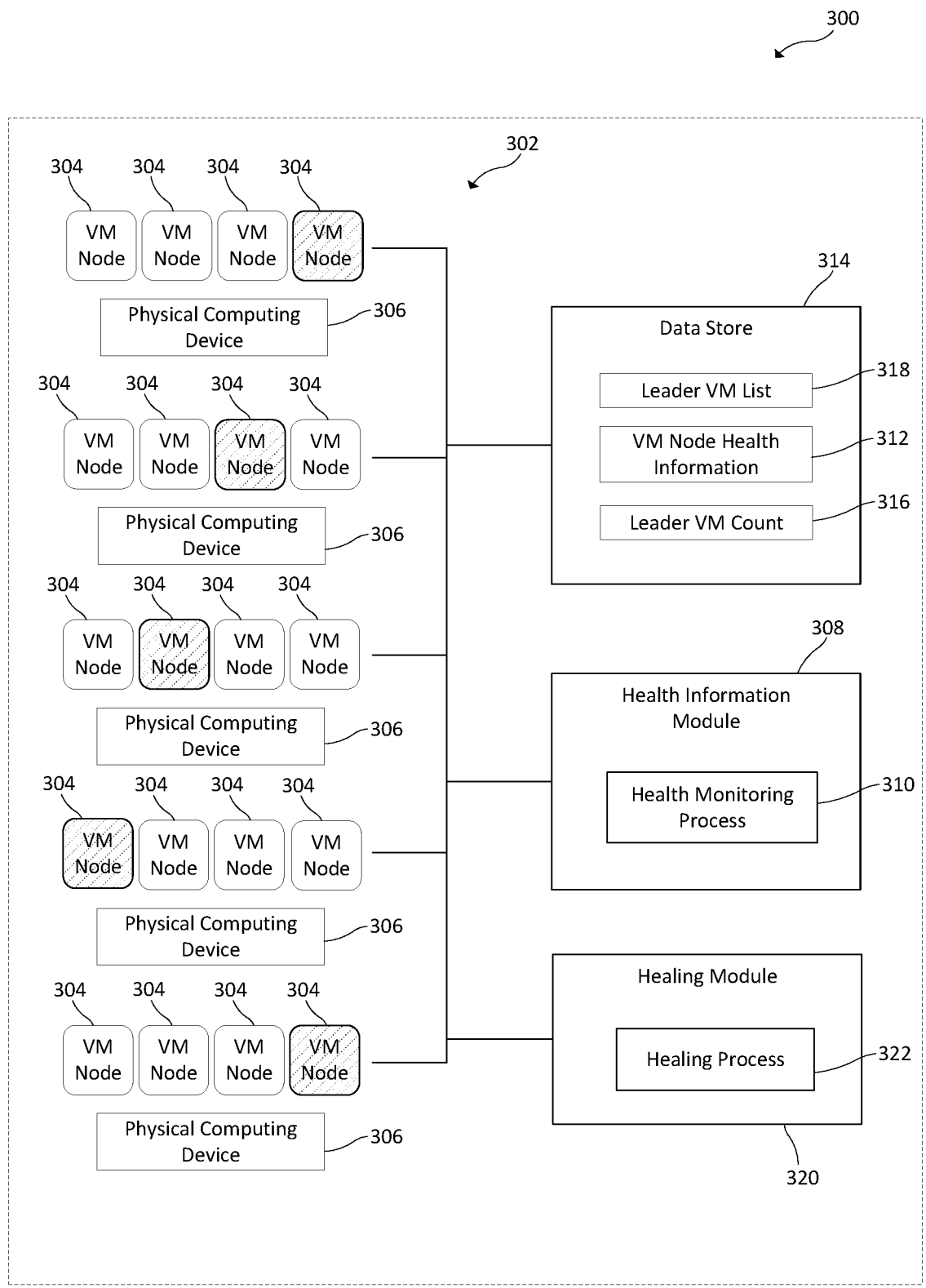
FIG. 3 shows an example of a peer VM monitoring and auto-healing system for monitoring the health of the VM nodes of a cloud computing system, such as the cloud computing system of FIG. 1.

FIG. 3 shows an example implementation of a peer VM health monitoring and auto healing system 300 for monitoring the health of a group 302 of VM nodes 304. The VM nodes 304 may implement one or more servers, server farms, server clusters, data centers, cloud services, and/or any other logical grouping of VMs. The system 300 includes a plurality of physical computing devices 306 for hosting the VM nodes 304. In the embodiment of FIG. 3, five computing devices 306 are shown although any suitable number of computing devices may be utilized. Each computing device 306 is shown as hosting four VM nodes 304. In embodiments, each computing device 306 may be configured to host any suitable number of VM nodes 304.

To implement the peer VM health monitoring and auto healing system 300, a predefined number of VM nodes 304 are selected to serve as leader VMs and tasked to periodically check the health status of each of the VM nodes 304 in addition to their normal duties for the VM infrastructure, such as processing requests. The system 300 includes a health information module 308 for collecting health information for the VM nodes 304 and storing the health information in the data store 314. The health information 312 for a VM node 304 may include health score, CPU usage, memory usage, degree of latency, last update time, hosting device identifier, and the like. The health information module 308 periodically performs a health monitoring process 310 to collect the health information. In embodiments, the health monitoring process 310 may be implemented as a circuit breaker process which can be run on each VM node 304 to collect the health information for the node, process the health information, and store the health information in the data store 314.

In embodiments, the data store 314 may be implemented by a distributed cache system. In some implementations, the distributed cache system may comprise a Remote Dictionary Server (Redis). Redis is an open-source, in memory, key-value data store that may be used to implement a database, a hash, or other types of data store. Redis provides a faster response time than databases that store data on a disk or solid-state drive, because the Redis data all resides in memory. In one implementation, the data store 314 is a hash table maintained by Redis, and the health monitoring process 310 writes the health information 312 for each VM node 304 to the hash table. The hash key may be an identifier associated with each VM and the hash value may be the VM health information. The hash table may store the most recently obtained health information for each VM node 304. In embodiments, the health information for the VM nodes is updated in the data store at a predetermined frequency. In one implementation, the health information is updated every five seconds although any suitable frequency may be used.

A leader VM count 316 defines the number of VM nodes 304 selected to serve as leader VMs for a group of nodes. The leader VM count 316 depends on the total number of VM nodes 304 and the number of physical computing devices 306 used to host the nodes 304. In embodiments, an algorithm is defined for determining the leader VM count 316. The algorithm may define the leader VM count 316 such that a predetermined number of leader VMs are selected for a given number of VM nodes 304 and/or a predetermined percentage of the VM nodes 304 are selected as leader VMs. In embodiments, the algorithm may define the leader VM count 316 in such a way that the leader VM count 316 increases as the total number of VM nodes 304 to be monitored increases. In one implementation, the leader VM count 316 is set to a predetermined amount, e.g., five leader VMs, when the total number of VM nodes is less than a hundred. When the total number of VM nodes 304 is greater than a hundred, the leader VM count is set to a predetermined percentage of the total number of VM nodes, e.g., 5%. Leader VMs check the health status of other leader VMs so that leader VMs that are identified as sick VMs may be removed as leader VMs and replaced with healthy VM nodes 304 so that the leader VM count 316 may be maintained. In embodiments, the system 300 may be configured to implement peer VM monitoring only when the total number of VMs to be monitored above a predetermined threshold value. For example, the system 300 may be configured to implement peer VM monitoring only when there are at least ten VM nodes to monitor. In embodiments, the value of the leader VM count 316 and/or the algorithm used to define the leader VM count 316 may be stored in the data store 314.

The leader VMs that are selected to fill the leader VM positions may be chosen based on their health status such that the healthiest VM nodes are selected to serve as leader VMs. The healthiest VM nodes may be determined from the VM node health information 312 stored in the data store. Unhealthy VMs and out-of-date VMs are not selected to serve as leader VMs. In addition, the VM nodes 304 selected as leader VMs are chosen from different physical computing devices 306 so that if a physical computing device 306 fails only a limited number of leader VMs may be lost. In embodiments, the number of leader VMs that may be hosted by a physical computing device at the same time is limited to a predetermined total number or predetermined percentage of the total number of leader VMs. For example, in embodiments, physical computing devices 306 may be limited to hosting one leader VM at a time. As another example, in embodiments, the number of leader VMs that may be hosted concurrently by a physical computing device is required to be less than a predetermined percentage, e.g., 20%, of the leader VM count 316. In the embodiment of FIG. 3, the leader VMs are indicated as the VM nodes having the cross-hatching. Since the total number of VM nodes 304 is twenty, the leader VM count is set to five, and one leader VM is chosen from each of the computing devices 306. In embodiments, the healthiest VM node 304 from each computing device may be selected as the leader VM.

The leader VMs are each configured to periodically perform a peer monitoring process in which the health information 312 for all of the VM nodes 304 is accessed in the data store 314 to identify sick VMs. Sick VMs may be identified from the health information in any suitable manner. In one implementation, sick VMs are identified based on the last update time for each VM node 304 stored in the data store 314. VMs having a last update time that is greater than a threshold value, e.g., 15 minutes, may be considered as sick VMs. In other implementations, sick VMs may be identified based on other parameters indicative of node health, such as health score, CPU usage, memory usage, degree of latency, and the like. Predetermined threshold values may be used for comparison with health parameters to identify sick VMs. In embodiments, sick VMs may be identified by marking the sick VM nodes as sick in the data store 314. Sick VM node information may be stored in association with each VM node 304 or may be stored separately in a data structure, such as a table. In embodiments, the peer monitoring process is performed to identify sick VMs at a predetermined interval/frequency. Any suitable interval/frequency may be used. In one implementation, leader VMs are configured to perform the peer monitoring process every five minutes.

Once sick VMs have been identified, an auto-healing process may be performed to attempt to heal the sick VMs. The system of FIG. 3 includes a healing module 320 that is configured to access the data store 314 to identify the sick VMs and to perform a healing process 322 on the sick VMs. In embodiments, the healing module 320 may be configured to place sick VMs in an inactive state so that the healing process 322 may be performed. A healing process may include various actions that may be used to diagnose and correct the issues causing performance problems in a VM, such as but not limited to rebooting or restarting the VM, clearing processes being executed on the VM, and/or other corrective actions that may improve the performance of the VM nodes. In embodiments, if a healing process results in the performance of the sick VM improving to the point that the VM is no longer considered sick, such as when the health score of the VM no longer exceeds a threshold value, the VM node may be marked as healthy in the data store 314 and returned to an active state. In embodiments, sick VMs that cannot be healed may be decommissioned and replaced, e.g., by instantiating another VM in its place.

Leader VMs perform peer monitoring for all VM nodes 304, including other leader VMs. It is possible for the performance of leader VMs to degrade to the point that a leader VM can be identified a sick VM. Leader VMs identified as sick VMs are removed as leader VMs. In embodiments, a leader VM list 318 is stored in a memory, such as the data store 314 or other memory that is accessible to the VM nodes 304. The leader VM list 318 includes a list of the current VM nodes which have been assigned to a leader VM position. In embodiments, each VM node may be configured to periodically check the leader VM list to determine whether there are currently enough leader VMs. For example, leader VMs that have been identified as sick and/or out-of-date VMs may be removed from the leader VM list 318. A leader selection process may be periodically performed to identify openings in the leader VM list, to identify current leader VMs that need to be replaced, and to select new leader VMs to ensure that the leader VM count is maintained.

Figure 4:
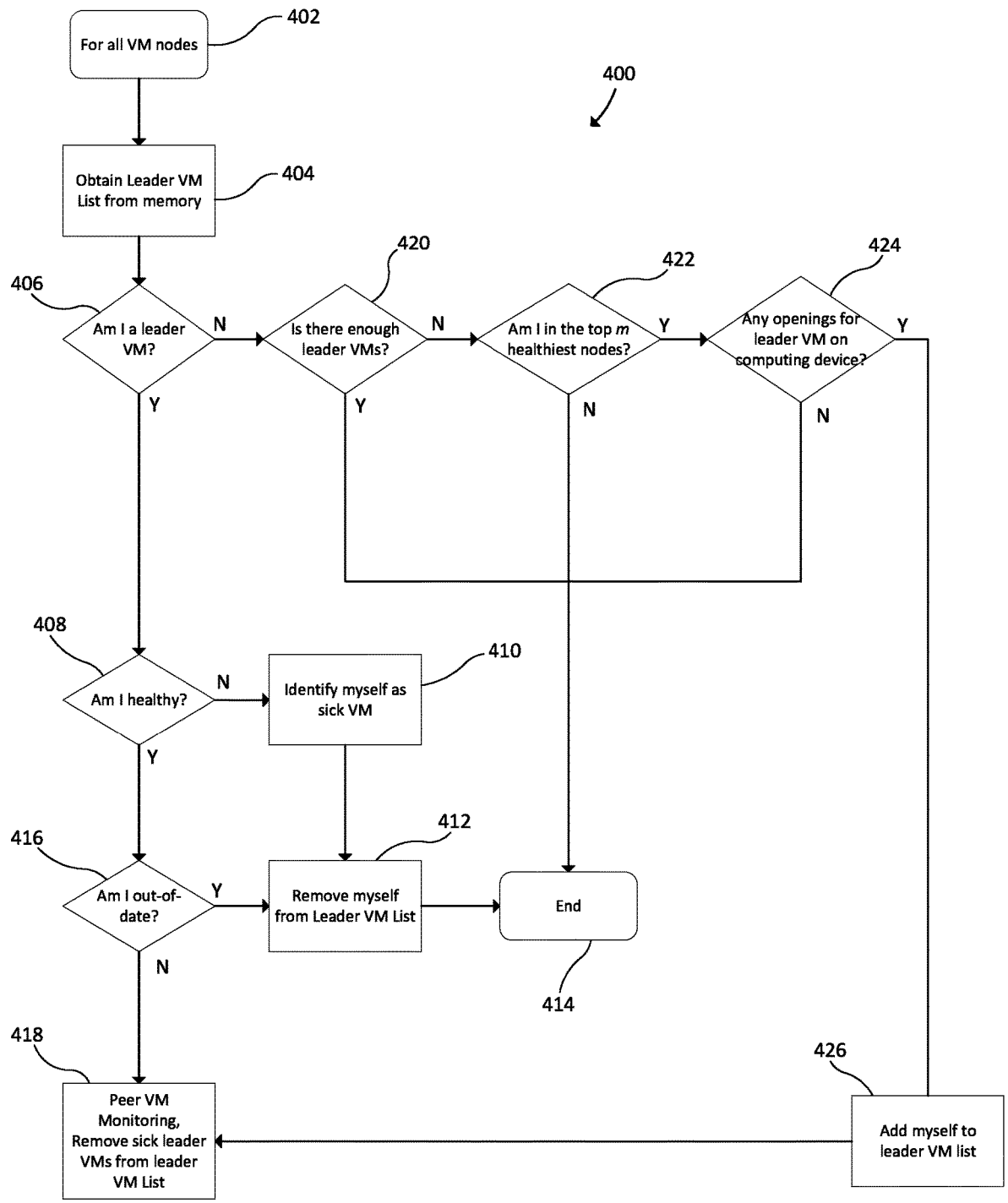
FIG. 4 is a flow diagram depicting an example method for deploying a resource in a server farm.

A flowchart of an example leader selection process 400 is shown in FIG. 4. The process 400 is performed by all VM nodes (block 402) at a predetermined frequency and/or interval. The process 400 begins with the VM node obtaining the leader VM list (block 404). A determination is then made as to whether the VM node is a leader VM (block 406). If the VM node is a leader VM, a determination is made as to whether the VM node is healthy (block 408), e.g., by comparing the health information for the node to a threshold value. If the leader VM is not healthy, the leader VM may identify itself as a sick VM (block 410), remove itself from the leader VM list (block 412), and the process ends (block 414). If the leader VM is healthy (block 408), a determination is made as to whether the VM node is out-of-date (block 416). If the leader VM is out-of-date, the leader VM removes itself from the leader VM list (block 412) and the process ends (block 414). If the leader VM is not out-of-date, the leader VM continues as a leader VM and performs the functions of a leader VM, such as peer VM monitoring and updating the leader VM list to remove sick leader VMs (block 418).

Returning to block 406, if the VM node is not a leader VM, a determination is made as to whether there is currently enough leader VMs (i.e., does the current number leader VMs from leader VM list=leader VM count?) (block 420). If there is enough leader VMs, the process ends (block 414). If there is not enough leader VMs, a determination is made as to whether the VM node is in the top m healthiest (non-leader) nodes (block 422), where m is the number of leader VM positions that need to be filled (i.e., leader VM count–the number of leader VMs currently on leader VM list). This information can be obtained by accessing the data store to obtain the health information for the VM nodes. If the VM node is one of the top m healthiest VM nodes, the VM node can try to claim a leader VM position. If the physical computing device hosting the VM node has an opening for a leader VM (block 424), the VM node may be added to the leader VM list to serve as a leader VM (block 426). The new leader VM may then perform the duties of a leader VM, such as peer VM monitoring and updating the leader VM list to remove sick VMs (block 426).

Figure 5:
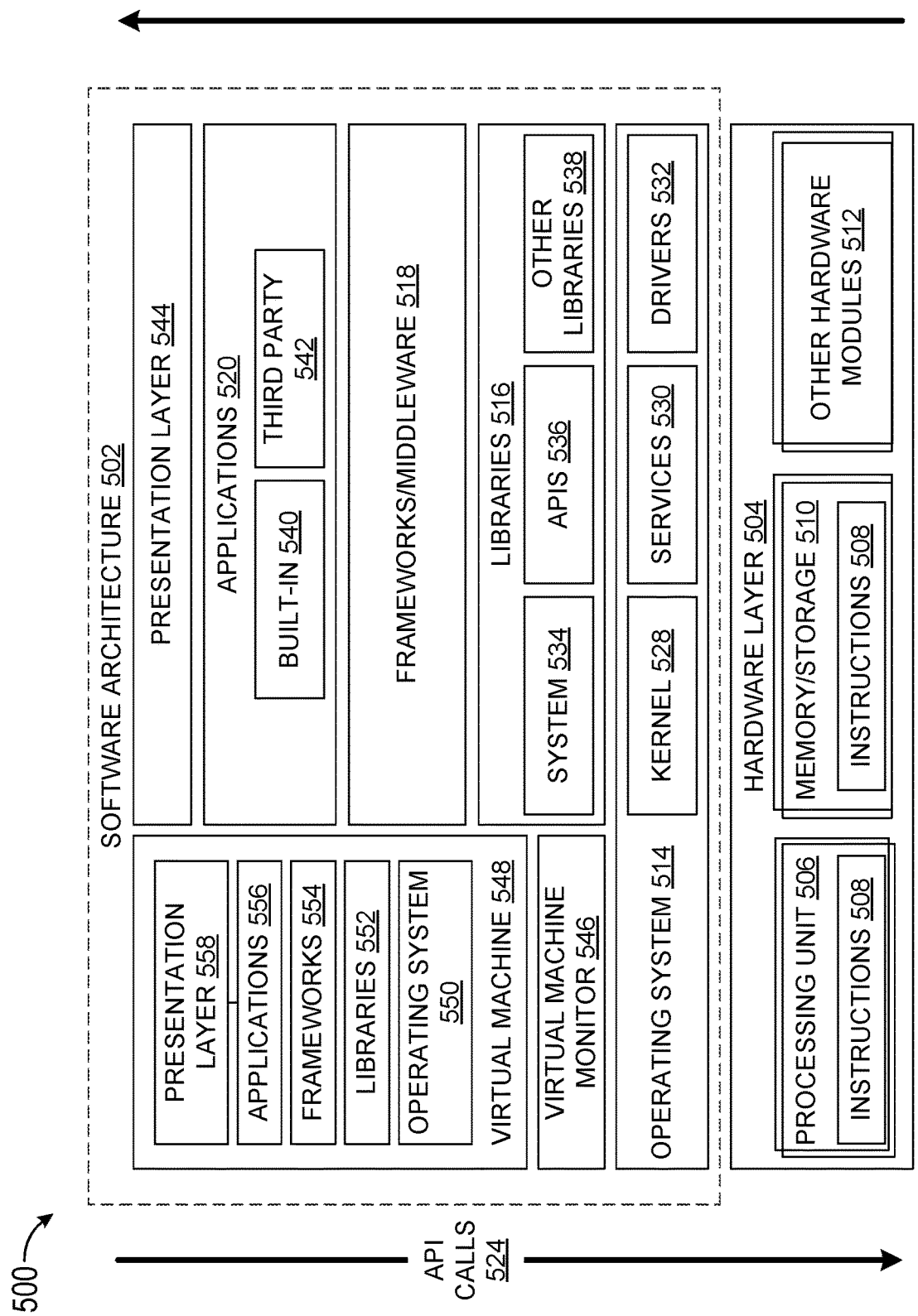
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 536 to other layers and receive corresponding results. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use VMs, as illustrated by a VM 548. The VM 548 provides an execution environment where applications/modules can execute as if they were executing on a hardware machine (such as the machine depicted in block diagram 600 of FIG. 6, for example). The VM 548 may be hosted by a host OS (for example, OS 514) or hypervisor, and may have a VM monitor 546 which manages operation of the VM 548 and interoperation with the host operating system. A software architecture, which may be different from software architecture 502 outside of the VM, executes within the VM 548 such as an OS 550, libraries 552, frameworks 554, applications 556, and/or a presentation layer 558.

Figure 6:
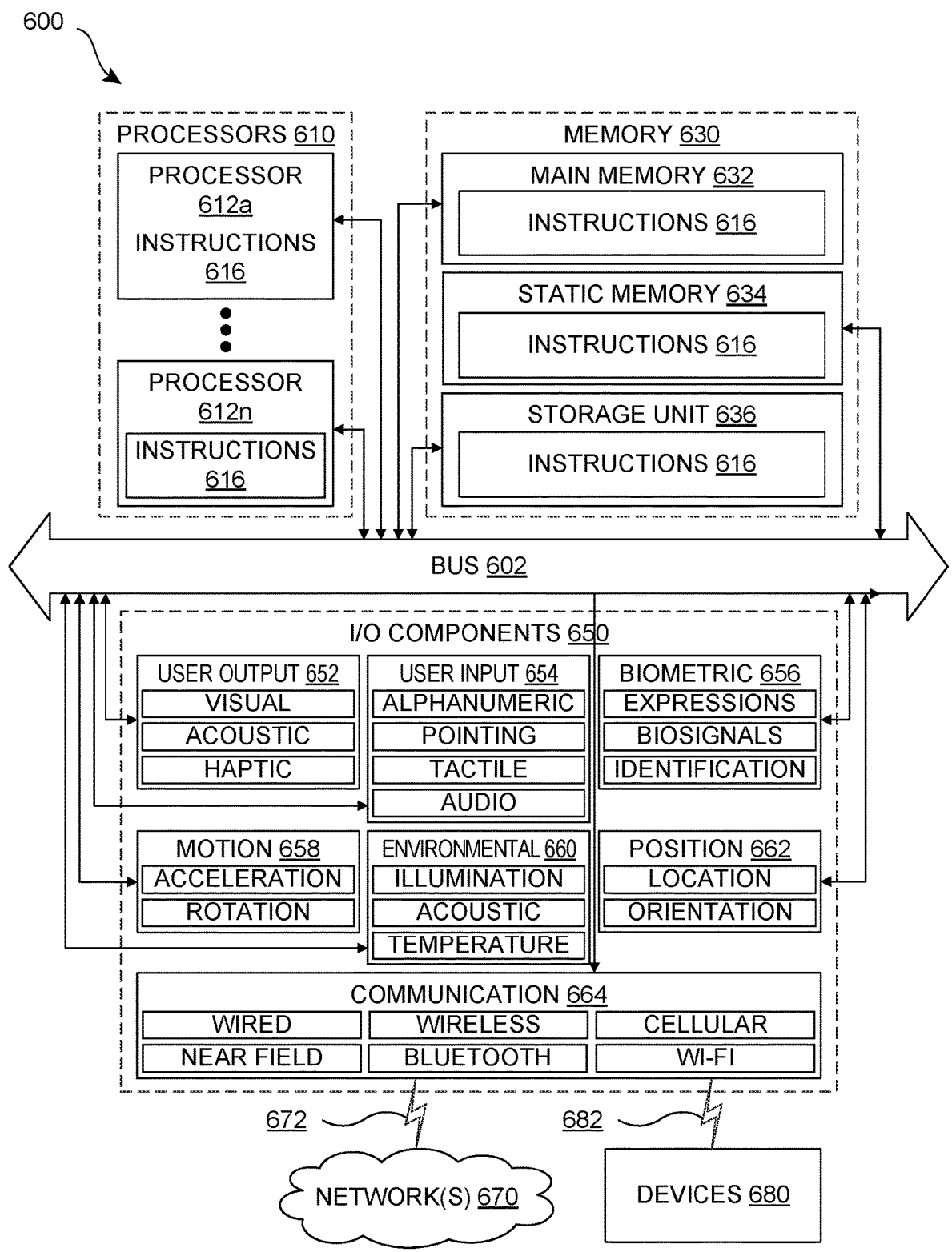
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
  determining a leader virtual machine (VM) count for a group of VM nodes hosted on a plurality of computing devices;
  selecting a number of the VM nodes of the group to serve as leader VMs for the group, the number of the VM nodes selected corresponding to the leader VM count; and
  periodically performing a peer VM monitoring process, the peer VM monitoring process including:
    periodically storing health information for each of the VM nodes of the group in a data store;
    periodically accessing the health information of each of the VM nodes to identify sick VMs using each of the leader VMs, respectively; and
    automatically performing a healing process on the sick VMs to improve a performance of the sick VMs.

Item 2. The data processing system of item 1, wherein the leader VM count corresponds to one of a predetermined number of VM nodes and a predetermined percentage of VM nodes depending on a total number of VM nodes in the group.

Item 3. The data processing system of any of items 1-2, wherein the leader VMs are selected such that the leader VMs are distributed among the plurality of computing devices.

Item 4. The data processing system of any of items 1-4, wherein the leader VMs are limited to a predetermined number on each of the computing devices.

Item 5. The data processing system of any of items 1-5, wherein the data store is a Remote Dictionary Server (Redis).

Item 6. The data processing system of any of items 1-6, wherein the functions further comprise:
  periodically performing a leader selection process, the leader selection processing including:
    determining a current number of leader VMs;
    determining a difference between the current number of leader VMs and the leader VM count;
    in response to the difference being greater than zero, identifying a VM node from the group having a predetermined health level and that is hosted on a computing device having an opening for a leader VM; and
    assigning the identified VM node as one of the leader VMs.

Item 7. The data processing system of any of items 1-6, wherein the health information includes health information for the leader VMs, and
  wherein, when a leader VMs is identified as a sick VM, the leader VM is removed from the leader VMs.

Item 8. The data processing system of any of items 1-7, wherein the functions further comprise:
  storing a leader VM list in a memory;
  determining the current number of leader VMs based on the leader VM list; and
  removing leader VMs from the leader VM list that are identified as sick VMs.

Item 9. The data processing system of any of items 1-8, further comprising:
  removing leader VMs from the leader VM list that are out-of-date VMs.

Item 10. A method of monitoring health of a group of virtual machine nodes, the method comprising:
  determining a leader virtual machine (VM) count for the group of VM nodes, the group of VM nodes being hosted on a plurality of computing devices;
  selecting a number of VM nodes from the group to serve as leader VMs for the group, the number of the VM nodes selected corresponding to the leader VM count; and
  periodically performing a peer VM monitoring process, the peer VM monitoring process including:
    periodically storing health information for each of the VM nodes of the group in a
    periodically accessing the health information of each of the VM nodes to identify sick VMs using each of the leader VMs, respectively; and
    automatically performing a healing process on the sick VMs to improve a performance of the sick VMs.

Item 11. The method of item 10, wherein the leader VM count corresponds to one of a predetermined number of VM nodes and a predetermined percentage of VM nodes depending on a total number of VM nodes in the group.

Item 12. The method of any of items 10-11, wherein the leader VMs are selected such that the leader VMs are distributed among the plurality of computing devices.

Item 13. The method of any of items 10-12, wherein the leader VMs are limited to a predetermined number on each of the computing devices.

Item 14. The method of any of items 10-13, wherein the data store is a Remote Dictionary Server (Redis).

Item 15. The method of any of items 10-14, further comprising:
   periodically performing a leader selection process, the leader selection processing including:
      determining a current number of leader VMs;
      determining a difference between the current number of leader VMs and the leader VM count;
      in response to the difference being greater than zero, identifying a VM node from the group having a predetermined health level and that is hosted on a computing device having an opening for a leader VM; and
      assigning the identified VM node as one of the leader VMs.

Item 16. The method of item 15, wherein the health information includes health information for the leader VMs, and wherein, when a leader VMs is identified as a sick VM, the leader VM is removed from the leader VMs.

Item 17. The method of any of items 10-16, wherein the functions further comprise:
   storing a leader VM list in a memory;
   determining the current number of leader VMs based on the leader VM list; and
   removing leader VMs from the leader VM list that are identified as sick VMs.

Item 18. The method of any of items 10-17, further comprising:
   removing leader VMs from the leader VM list that are out-of-date VMs.

Item 19. A non-transitory computer readable medium on which are stored instructions that, when executed, cause a programmable device to perform functions of:
   determining a leader virtual machine (VM) count for a group of VM nodes, the group of VM nodes being hosted on a plurality of computing devices;
   selecting a number of VM nodes from the group to serve as leader VMs for the group, the number of the VM nodes selected corresponding to the leader VM count; and
   periodically performing a peer VM monitoring process, the peer VM monitoring process including:
   periodically storing health information for each of the VM nodes of the group in a data store;
   periodically accessing the health information of each of the VM nodes to identify sick VMs using each of the leader VMs, respectively; and
   automatically performing a healing process on the sick VMs to improve a performance of the sick VMs.

Item 20. The non-transitory computer readable medium of item 19, wherein the functions further comprise:
   periodically performing a leader selection process, the leader selection processing including:
      determining a current number of leader VMs;
      determining a difference between the current number of leader VMs and the leader VM count;
      in response to the difference being greater than zero, identifying a VM node from the group having a predetermined health level and that is hosted on a computing device having an opening for a leader VM; and
      assigning the identified VM node as one of the leader VMs.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   determining a leader virtual machine (VM) count for a group of VM nodes hosted on a plurality of computing devices;
      selecting a number of the VM nodes of the group to serve as leader VMs for the group, the number of the VM nodes selected corresponding to the leader VM count;
   periodically performing a peer VM monitoring process, the peer VM monitoring process including:
      storing health information for each of the VM nodes of the group in a data store;
      accessing the health information of each of the VM nodes to identify unhealthy VMs using the leader VMs; and
      automatically performing a healing process on the unhealthy VMs to improve performance of the unhealthy VMs; and
   periodically performing a leader selection process comprising:
      determining a current number of leader VMs;
      determining a difference between the current number of leader VMs and the leader VM count;
      in response to the difference being other than zero, identifying a VM node from the group having a predetermined health level; and
      assigning the identified VM node as one of the leader VMs.

2. The data processing system of claim 1, wherein the leader VM count corresponds to one of a predetermined number of VM nodes and a predetermined percentage of VM nodes depending on a total number of VM nodes in the group.

3. The data processing system of claim 1, wherein the leader VMs are selected such that the leader VMs are distributed among the plurality of computing devices.

4. The data processing system of claim 3, wherein the leader VMs are limited to a predetermined number on the computing devices.

5. The data processing system of claim 1, wherein the data store is a Remote Dictionary Server (Redis).

6. The data processing system of claim 1, wherein the leader selection process comprises
   identifying a VM node that is hosted on a computing device having an opening for a leader VM.

7. The data processing system of claim 6, wherein the health information includes health information for the leader VMs, and
   wherein, when a leader VMs is identified as a unhealthy VM, the leader VM is removed from the leader VMs.

8. The data processing system of claim 7, wherein the functions further comprise:
   storing a leader VM list in a memory;
   determining the current number of leader VMs based on the leader VM list; and
   removing leader VMs from the leader VM list that are identified as unhealthy VMs.

9. The data processing system of claim 8, further comprising:
   removing leader VMs from the leader VM list that are out-of-date VMs.

10. A method of monitoring health of a group of virtual machine nodes, the method comprising:
    determining a leader virtual machine (VM) count for the group of VM nodes, the group of VM nodes being hosted on a plurality of computing devices;
    selecting a number of VM nodes from the group to serve as leader VMs for the group, the number of the VM nodes selected corresponding to the leader VM count;
    periodically performing a peer VM monitoring process, the peer VM monitoring process including:
       storing health information for each of the VM nodes of the group in a data store;
       accessing the health information of the VM nodes to identify unhealthy VMs using the leader VMs; and
       automatically performing a healing process on the unhealthy VMs to improve performance of the unhealthy VMs; and
    periodically performing a leader selection process comprising:
       determining a current number of leader VMs;
       determining a difference between the current number of leader VMs and the leader VM count;
       in response to the difference being other than zero, identifying a VM node from the group having a predetermined health level; and
       assigning the identified VM node as one of the leader VMs.

11. The method of claim 10, wherein the leader VM count corresponds to one of a predetermined number of VM nodes and a predetermined percentage of VM nodes depending on a total number of VM nodes in the group.

12. The method of claim 10, wherein the leader VMs are selected such that the leader VMs are distributed among the plurality of computing devices.

13. The method of claim 12, wherein the leader VMs are limited to a predetermined number on the computing devices.

14. The method of claim 10, wherein the data store is a Remote Dictionary Server (Redis).

15. The method of claim 10, further comprising:
    leader selection process comprises
       identifying a VM node that is hosted on a computing device having an opening for a leader VM.

16. The method of claim 15, wherein the health information includes health information for the leader VMs, and
    wherein, when a leader VMs is identified as a unhealthy VM, the leader VM is removed from the leader VMs.

17. The method of claim 16, further comprising
    storing a leader VM list in a memory;

determining the current number of leader VMs based on the leader VM list; and removing leader VMs from the leader VM list that are identified as unhealthy VMs.

18. The method of claim 17, further comprising:

removing leader VMs from the leader VM list that are out-of-date VMs.

19. A non-transitory computer readable medium on which are stored instructions that, when executed, cause a programmable device to perform functions of:

determining a leader virtual machine (VM) count for a group of VM nodes, the group of VM nodes being hosted on a plurality of computing devices;

selecting a number of VM nodes from the group to serve as leader VMs for the group, the number of the VM nodes selected corresponding to the leader VM count;

periodically performing a peer VM monitoring process, the peer VM monitoring process including:

storing health information for each of the VM nodes of the group in a data store;

accessing the health information of each of the VM nodes to identify unhealthy VMs using the leader VMs; and automatically performing a healing process on the unhealthy VMs to improve performance of the unhealthy VMs; and periodically performing a leader selection process comprising:

determining a current number of leader VMs;

determining a difference between the current number of leader VMs and the leader VM count;

in response to the difference being other than zero, identifying a VM node from the group having a predetermined health level; and assigning the identified VM node as one of the leader VMs.

20. The non-transitory computer readable medium of claim 19, wherein the functions further comprise:

leader selection process comprises identifying a VM node that is hosted on a computing device having an opening for a leader VM.

* * * * *